June 6, 1961 F. F. ZAWASKI 2,987,199
STORAGE UNIT

Filed June 5, 1957 5 Sheets-Sheet 1

INVENTOR.
Felix F. Zawaski.
BY
Harness, Dickey & Pierce
ATTORNEYS.

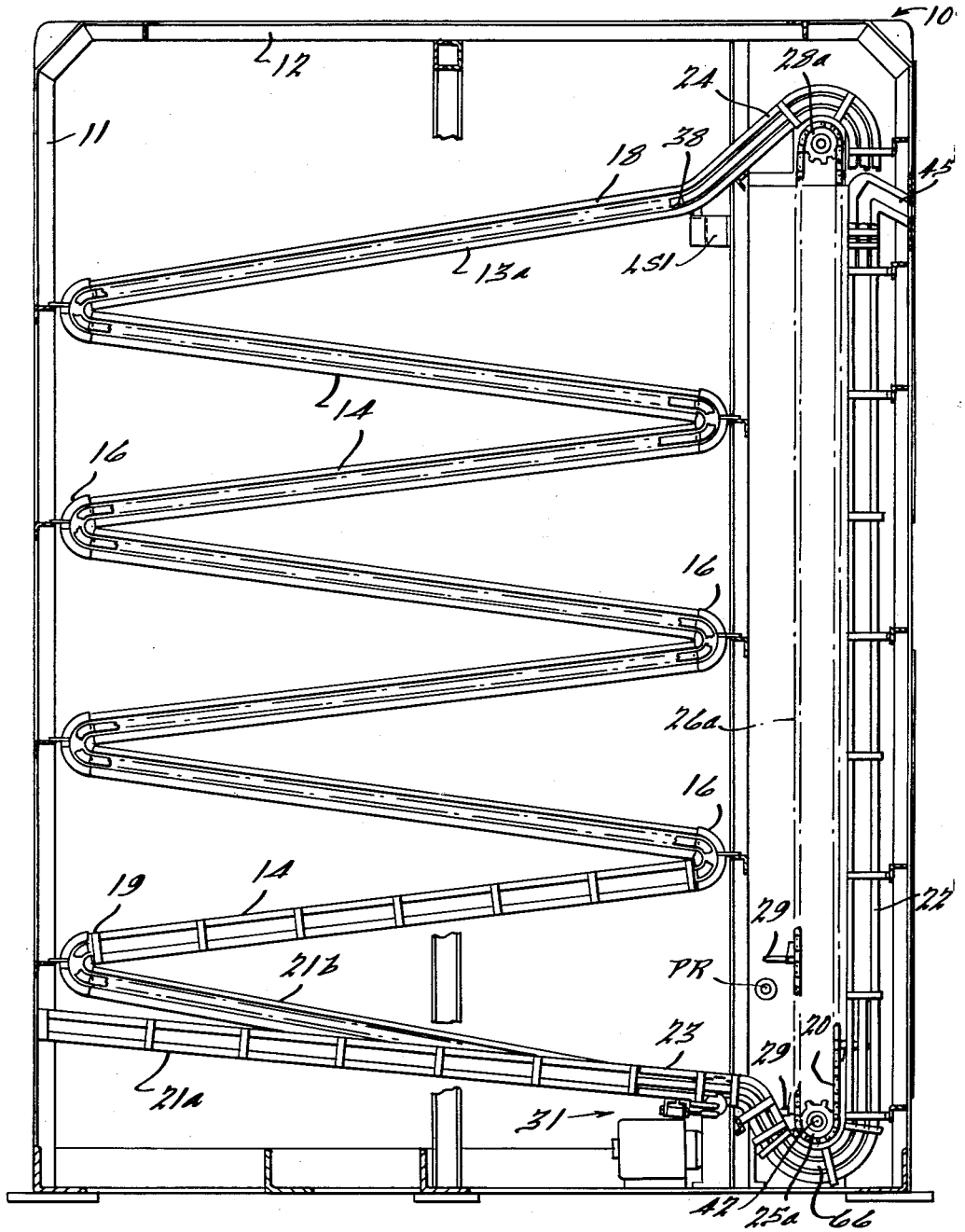

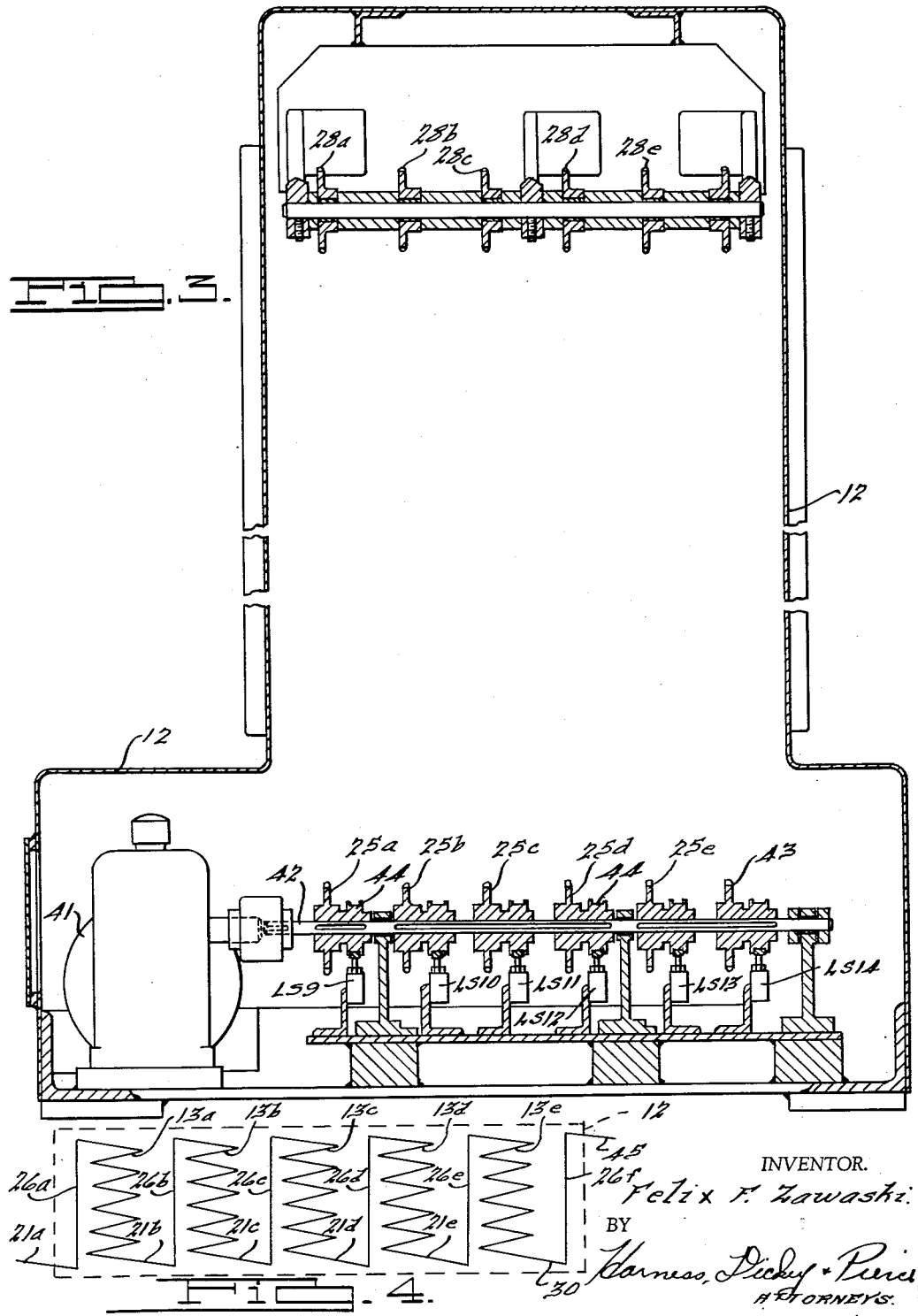

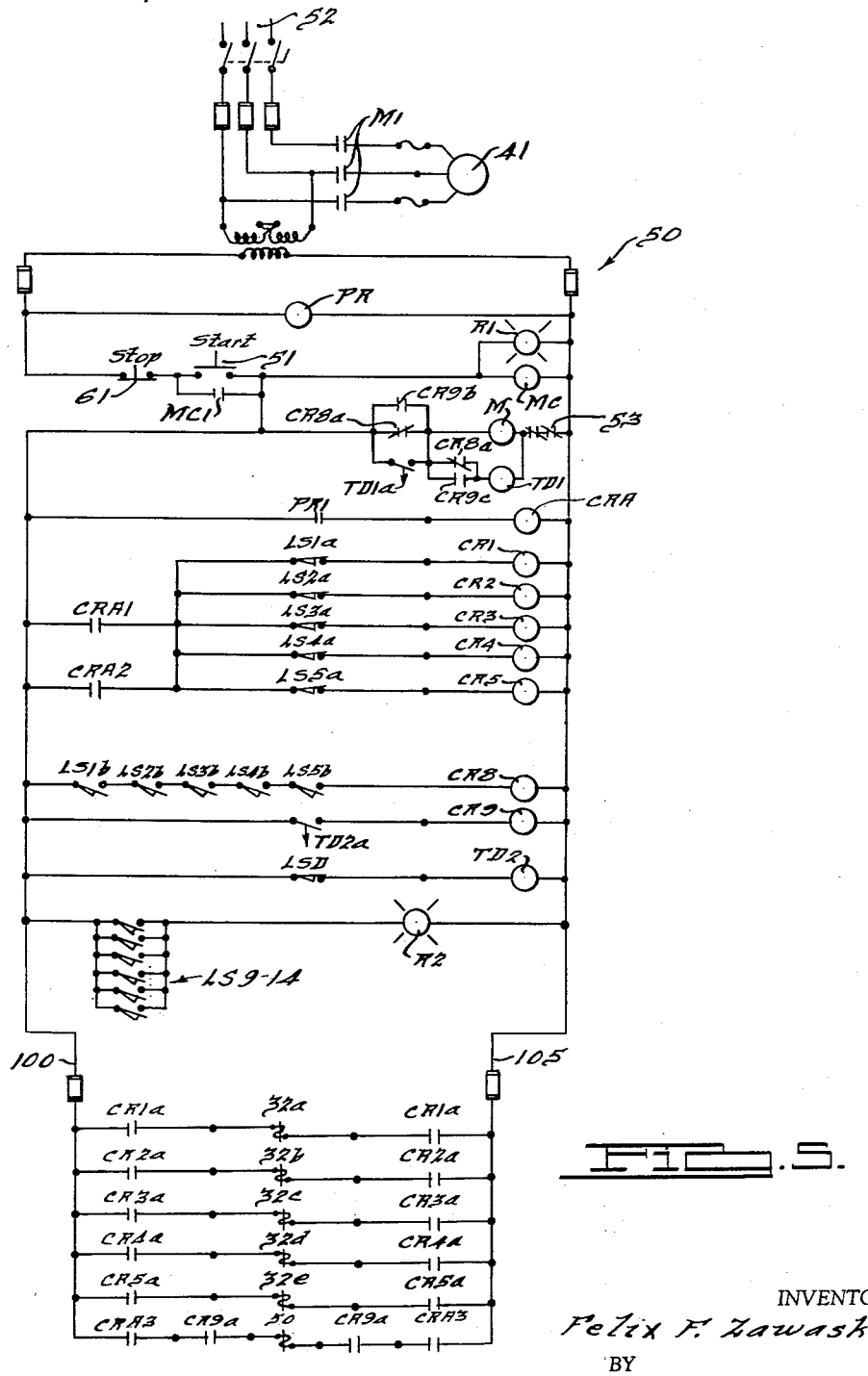

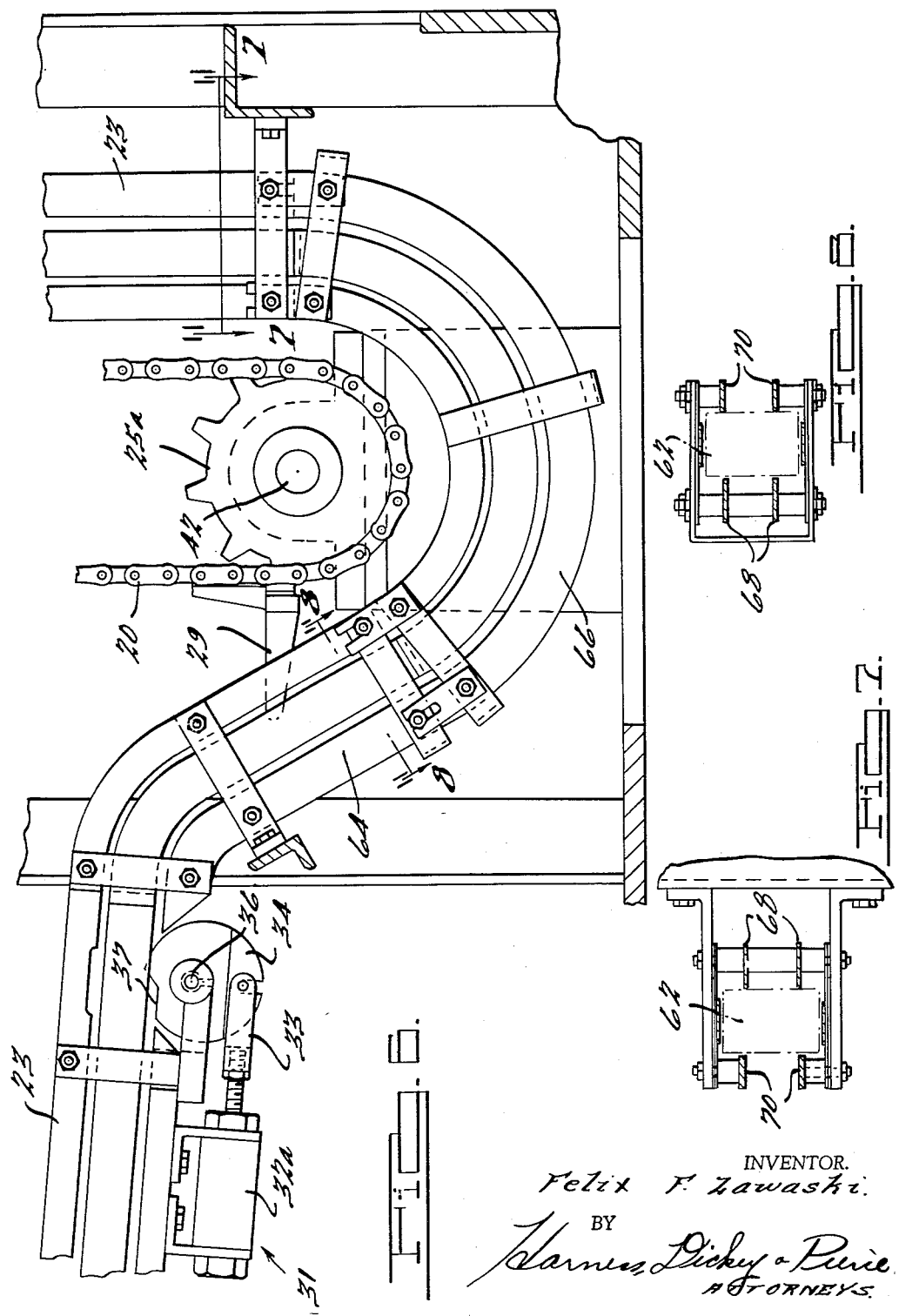

United States Patent Office 2,987,199
Patented June 6, 1961

2,987,199
STORAGE UNIT
Felix F. Zawaski, Dearborn, Mich., assignor to Michigan Tool Company, a corporation of Delaware
Filed June 5, 1957, Ser. No. 663,821
3 Claims. (Cl. 214—16)

This invention relates generally to storage devices and, more particularly, to an improved storage unit adapted to be disposed in an automatic production line for gears or the like.

In an automated production line for manufacturing gears and the like, one or more machines adapted to perform one type of machine operation may be continuously supplying one or more machines adapted to perform another type of machining operation on the gear or other workpiece. For example, one or more hobbing machines may be continuously supplying one or more shaving machines.

It is of course practically impossible to control the rate of the supplying machines so that the workpieces are fed to the next or demand machines at a rate corresponding to the maximum rate of operation of the demand machines. Accordingly, enough supply machines are provided to insure a continual supply of more than enough parts to the demand machine to build up a backlog of parts to take care of those times during which one or more of the supply machines is shut down. This invention provides a storage unit adapted to be interposed between the supply and the demand machines for storing workpieces fed to the unit from the supply machines and for selectively feeding the workpieces one at a time to the demand machines as required.

An object of this invention, therefore, is to provide an improved storage unit of the above type.

A further object of this invention is to provide an improved storage unit which is operable to continually store and selectively discharge workpieces in accordance with the requirements of the machines which are supplied from the storage unit.

Another object of this invention is to provide a storage unit of the above type which includes a plurality of zigzag gravity storage tracks arranged in a line so that one or more tracks are filled with workpieces as required.

Still another object of this invention is to provide a storage unit which is simple in construction, economical to manufacture, and which may be readily connected in a production line to provide for an efficient supply of workpieces from one group of machines in the line to the next successive group of machines.

The above as well as other objects, features and advantages of this invention will become apparent from the following description, the appended claims and the accompanying drawing in which:

FIG. 2 is a front elevational view of the storage unit of this invention with part of the casing therefor broken away for the purpose of better illustrating the construction of the unit;

FIG. 3 is a vertical sectional view, with portions removed, looking at one end of the unit shown in FIG. 1;

FIG. 4 is a diagrammatic illustration of the zigzag tracks and connecting elevators in the storage unit of this invention;

FIG. 5 is a diagrammatic illustration of the electrical wiring system for the storage unit of this invention;

Figure 1:
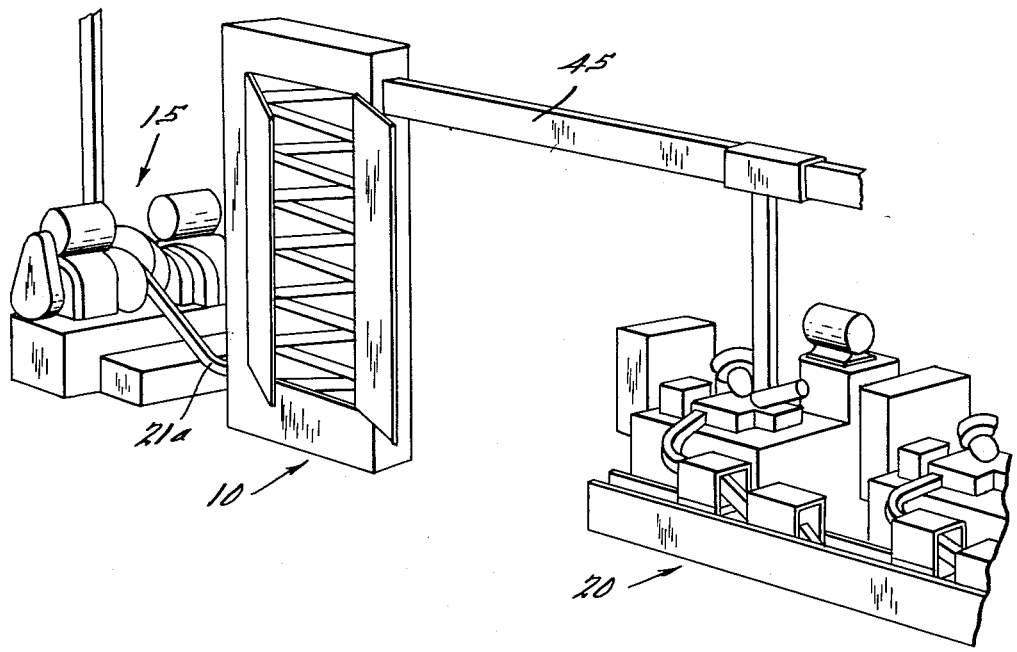
FIGURE 1 is a fragmentary diagrammatic perspective view of the storage unit of this invention shown in assembly relation with a portion of a production line.

FIG. 6 is an enlarged fragmentary view of a portion of the storage unit illustrated in FIG. 2; and FIGS. 7 and 8 are transverse sectional views looking along the lines 7—7 and 8—8 in FIG. 6.

With reference to the drawing, the storage unit of this invention, indicated generally at 10, is illustrated in FIG. 1 installed in a production line between a grinder 15 and a gear hobber 20. As best appears in FIG. 2, the unit 10 includes an upright frame 11 for a casing 12. Arranged within the casing 12 and supported on the frame 11 are five zigzag-shape tracks 13a–e, inclusive, arranged in an upright side by side relation. The first track 13a is clearly illustrated in FIG. 2 and only this track will be described in detail hereinafter since all of the tracks are identical. The track 13a is formed of a plurality of vertically spaced track or chute sections or members 14, each section being reversely inclined relative to the adjacent track section. Adjacent ends of adjacent sections 14 are connected by reversely curved track connecting members 16. As many or as few tracks 13 may be used in the unit 10 as desired, with the number of tracks used depending on the desired storage capacity of the unit 10. Five tracks are illustrated only for the purpose of example.

The track 13a includes an upper or inlet end 18 and a lower or outlet end 19. A feeding track or chute 21a is provided for delivering parts from one or more supply machines, illustrated as the grinder 15, to the track 13a. Similar feeding chutes 21b–e, inclusive, deliver parts to the corresponding tracks 13b–e, inclusive, from the adjacent preceding tracks in line. The feeding track 21a empties into a transversely extending lower portion 23 of an upright guide frame 22 having an upper transverse portion 24 communicating with the inlet end 18 of the track 13a. A similar guide frame (not shown) is provided for each of the tracks 13b–e, inclusive, connecting the feeding chute therefor with the track inlet. A vertically movable endless conveyor 26a is provided for moving parts vertically in the guide frame 22 to the inlet 18 for the track 13a. The conveyor 26a for the end track 13a includes a chain 20 trained about a sprocket 25a, carried on a shaft 42 in a side by side relation with similar sprockets 25b–e, inclusive, and a vertically aligned sprocket 28a.

Similar conveyors 26b–e, inclusive (FIG. 4), having vertically aligned pairs of sprockets 25b–e, inclusive, and 28b–e, inclusive, are provided for the corresponding tracks 13b–e, inclusive. The chain 20 includes laterally projected finger members 29 spaced longitudinally of the chain 20 which travels in a counterclockwise direction as viewed in FIGS. 2 and 6 so that a finger 29 is movable from the bottom to the top of the guide 22 for moving a workpiece to the inlet end 18 of the track 13a.

A discharge mechanism 31 is provided for each feeding chute 21a–e, inclusive, and for a discharge chute 30 (FIG. 4) for the last track 13e. The discharge mechanisms 31 for the chutes 21a–e, inclusive, include solenoids 32a–e, inclusive (FIG. 5) corresponding to the chutes 21a–e, inclusive. Each solenoid is provided with an arm 33 (FIG. 6) connected to one side of a cradle member 34 pivotally supported at 36 on the guide portion 23. The cradle member 34 for the solenoid 32a is formed with a cradle shape surface 37 positioned within the guide portion 23 for receiving a workpiece from the inlet chute 21a. A workpiece in the chute 21a moves, under the action of gravity, into the guide portion 23 until it engages the cradle member 34 which projects into the guide portion 23 a distance sufficient to preclude movement of the workpiece past the member 34. In the position of the cradle 34 illustrated in FIG. 6 a workpiece moves to a supported position on the surface 37. On operation of the solenoid 32a to retract the arm 33 the cradle member 34 is rocked in a clockwise direction as viewed in FIG. 6 to tip the surface 37 and eject the workpiece supported thereon and block the next succeeding workpiece. The solenoid 32a on de-energization thereof returns to the position illustrated in FIG. 6 for receiving the next workpiece. The other solenoids 32b–e, inclusive, operate in the same way to provide for operation of their respective discharge mechanisms.

As best appears in FIGS. 6, 7 and 8, a workpiece, which is preferably of the cylindrical outline shape illustrated at 62 in FIGS. 7 and 8, moves downwardly under the action of gravity from the discharge mechanism 31 on a downwardly inclined portion 64 of the guide frame 23.

The portion 64 connects at its lower end with a curved guide frame portion 66 which is concentric with the sprocket 25a. A finger 29 on the chain 20 operates, on movement through the portion 66, to engage a workpiece for lifting the workpiece upwardly on the guide frame 23.

The guide frame 23 includes a first pair of outer bars or rails 68 arranged in a parallel spaced relation and a second pair of bars or rails 70 arranged opposite and in a confronting relation with the bars 68. The pairs of bars 68 and 70 are spaced apart a distance to receive a workpiece 62 therebetween. During travel on the guide frame 23 a workpiece 62 rides on either the adjacent edges of the bars 68 or the bars 70 to thus facilitate movement of the workpiece.

Mounted in the guide portion 24 opposite the inlet 18 for the track 13a is a limit switch LS1, provided with a first pair of contacts LS1a and a second pair of contacts LS1b. Similar switches LS2–5, inclusive, are provided for the tracks 13b–e, inclusive, and the pairs of contacts therefor corresponding to the contacts LS1a and LS1b are similarly provided with the letter suffixes a and b. An operating blade 38 for the switch LS1 is biased upwardly to a position normally closing the contacts LS1a, and opening the contacts LS1b. Travel of a workpiece onto the blade 38 provides for movement of the blade 38 to a position opening the normally closed contacts LS1a and closing the normally open contacts LS1b.

A motor 41 arranged within the casing 12 at the lower end thereof (FIG. 3) drives the shaft 42 which carries the sprockets 25a–e, inclusive, along with a sixth sprocket 43 arranged adjacent the end sprocket 25e. A plurality of clutches 44, corresponding to the sprockets 25a–e, inclusive, and 43, are operatively associated with corresponding switches LS9–14, inclusive. It can thus be seen that on operation of the motor 41, the endless conveyors 26a–e, inclusive, for the five tracks are operated along with a sixth endless conveyor 26f which cooperates with a sixth guide frame 22 to lift workpieces from the storage unit 10 to a downwardly inclined overhead track 45 feeding to the demand machines. In the event one of the conveyors 26 become jammed for any reason, the clutch 44 corresponding to the conveyor 26 operates to discontinue the transmission of power to the corresponding sprocket and also to close the corresponding switch LS9–14, inclusive. Closing of any one of the switches LS9–14, inclusive, completes a circuit through a warning light R2 (FIG. 3).

It is seen, therefore, that the storage unit 10 of this invention includes five zigzag tracks 13a–e, inclusive, arranged side by side. A feeding chute 21a and a guide 22 along with a conveyor 26a provides for a feeding of workpieces from the supply machines to the first track 13a. Workpieces fed to the first track 13a travel downwardly on the track members 14 therefor to the outlet end 19 of the track 13a. Workpieces which roll are the type most satisfactorily used in the unit 10 since they readily roll from one track member 14 to the next.

The second feeding chute 21b connects the outlet end 19 of the first track 13a to the lower portion 23 of the guide 22 for the adjacent track 13b. Thus, workpieces fed into the inlet end 18 of the first track 13a are movable therefrom to the second track 13b, from the second track 13b to the third track 13c, etc., until the workpiece is finally moved to the outlet end 19 of the final track 13e. From the outlet end 19 of the final track 13e, a workpiece is fed to the conveyor 26f which delivers the workpiece to the feed track 45 for the demand machines.

For selectively feeding the workpieces to the demand machines, a control circuit indicated generally at 50 in FIG. 5, is provided. The circuit 50 includes a starting switch 51 of push button type which, when closed, completes a circuit from a source of current supply indicated at 52 through a relay MC, provided with locking contacts MC1. On closing of the switch 51 to energize the relay MC, a circuit is completed through a relay M having normally open contacts M1 which are closed to start the motor 41. Overload contacts 53 are series connected with the relay M.

On starting of the motor 41, all of the conveyors 26 are operated so that they rotate in a counterclockwise direction as viewed in FIG. 2. As soon as a finger 29 on the conveyor 26a comes to a position adjacent a proximity relay PR carried on the casing 12, the relay PR is energized so as to close a set of normally open contacts PR1 and thereby energize a relay CRA provided with normally open contacts CRA1 and CRA2.

On energizing of relay CRA, both sets of normally open contacts CRA1 and CRA2 are closed to in turn provide for an energizing of five relays CR1–5, inclusive, corresponding to the five tracks 13a–e, inclusive, and having corresponding sets of normally open contacts CR1a–CR5a, inclusive. As best appears in FIG. 5, switches LS1a–LS5a, inclusive, correspond to and are connected in series with each of the control relays CR1–CR5, inclusive. Likewise corresponding to each of the control relays CR1–CR5, inclusive, are the five solenoids 32a–e, inclusive, which are connected through lines 100 and 105 to the circuit 50 so that they are separately energized on closing of the normally open corresponding contacts CR1a–CR5a, inclusive. On energizing of the solenoid 32a, the discharge mechanism 31 corresponding thereto is operated to eject a workpiece in the guide portion 23 associated therewith for travel onto the curved guide frame portion 66 at the lower end of the guide frame 22 where the workpiece is subsequently picked up by a finger 29 on the conveyor 26a for upward travel and discharge onto the guide frame portion 24. When the workpiece is discharged onto the guide portion 24, it travels under the action of gravity, across the switch blade 38 for the switch LS1 to open the contacts LS1a and close the contacts LS1b. However, the workpiece quickly rolls off the blade 38 so that the contacts return to their initial positions.

The first workpiece travels off the track 13a onto the feeding chute 21b which delivers the workpiece to the discharge mechanism 31 for the track 13b. This mechanism 31 is operated by the solenoid 32b which is energized the next time PR is energized so that it operates to move the workpiece to the conveyor 26b which in turn delivers the workpiece to the second track 13b, with this procedure being repeated until the workpiece reaches the end track 13e. In other words, each time a workpiece is fed to a discharge mechanism 31, it remains at the mechanism 31 until a finger 29 is moved past the relay PR so that the proximity relay operates as above described to provide for operation of the discharge mechanism 31 to move the workpiece onto the guide frame 66 for pickup by the approaching finger 29. The fingers 29 are spaced apart a distance such that they cooperate with the proximity relay PR to insure a delivery of a workpiece at the frame portion 66 by the time a finger 29 has advanced from the relay PR to the frame portion 66. The fingers 29 for the conveyors 26a–c, inclusive, thus operate in unison to transfer workpieces to the inlet ends 18 of the corresponding tracks 13a–e, inclusive.

The end track 13e gradually fills with workpieces until the workpieces back up on to the blade 38 for the switch LS5 to hold the contacts LS5a open and close the contacts LS5b. Since the contacts LS5a are held open, the circuit for control relay CR5 is maintained open so that the solenoid 32e cannot be energized on the next energizing of PR. Consequently, no more workpieces are fed to the end track 13e.

This action is repeated for the next track 13d when it is filled and when all of the tracks 13 have been filled all of the series connected contacts LS1b–LS5b, inclusive, have been closed. As a consequence CR8, which is in series with contacts LS1b–LS5b, is energized to in turn provide for the opening of the normally closed contacts CR8a connected in circuit with a relay TD1. The relay TD1, on being de-energized, provides for opening of a switch TD1a controlled thereby, which is of time delay type so that it is slow to open. Thus, the time delay switch TD1a prevents the motor relay M from being de-energized for a predetermined time interval necessary to allow for any unnecessary stoppage of the storage unit 10. In other words, in the event the storage unit 10 has been only momentarily filled, the time delay switch TD1 prevents any unnecessary stopping of the motor 41.

In the event none of the contacts LS1b–LS5b are opened within the time period provided for opening of the switch TD1a, the motor relay M is timed out and the operation of the conveyors 26 is stopped. It is apparent that the supply machine or machines (not shown) for the storage unit 10, illustrated as the grinder 15, may be conveniently connected with the motor relay M for interlocked operation therewith. In other words, when the relay M is de-energized, the circuits for the supply machines are opened so that the supply machines do not continue to feed workpieces to the unit 10.

Operatively associated with the feeding chute 45 for the demand machine or machines, illustrated as the hobber 20, is a demand limit switch LSD (FIG. 5) which is normally held open by the stock in the feed track 45. However, when this stock reaches a predetermined low limit, the switch LSD is closed to energize a relay TD2 which provides for closing of a switch TD2a, thus energizing a relay CR9 connected in series therewith. The relay CR9 has three sets of normally open contacts CR9a, CR9b, and CR9c, as shown in FIG. 5. On energizing of the relay CR9, contacts CR9b and CR9c are closed to again energize relays M and TD1 so that the conveyors 26 are again started. Likewise, solenoid 50, which is connected in series with contacts CRA3 and CR9a, is energized to provide for feeding of the workpieces in the last track 13e to the conveyor 26f operated by the sprocket 43 for feeding workpieces to the feeder track 45.

In other words, solenoid 50 operates a discharge mechanism, like the mechanism 31, for discharging workpieces, one at a time, from the last track 13e to the elevating conveyor 26f. The contacts CRA3 are connected in series with the contacts CR9a and the solenoid 50 to provide for an alternate energizing and de-energizing of the solenoid 50 to operate the corresponding discharge mechanism 31 and feed workpieces one at a time to the track 45. Stated otherwise, since the contacts CRA3 are under the control of PR1, they are alternately opened and closed.

The parts are then transferred from one track to the next and thence into the feeder track 45 for the demand machines since, as soon as the endmost track 13e has started to empty, LS5a is closed so that solenoid 32e is energized and workpieces are transferred from track 13d to track 13e. This sequence then follows for all the tracks so that a continuous feeding operation is again commenced. When the feeder track 45 for the demand machines has been filled to a predetermined high limit, the switch LSD is opened, de-energizing relay TD2 and the switch TD2a opens after a predetermined time delay to avoid shutting off the motor 41 for only a momentary satisfying of the demand machine requirements. As soon as the switch TD2a times open, relay CR9 is de-energized so that M is again timed out by TD1 and the storage unit 10 is returned to an idle condition. It is apparent, of course, that relay TD1 is de-energized at such time only if relay CR8 has been energized to open the contacts CR8a. In other words, if the unit 10 has not been filled, the motor 41 continues to operate.

It is seen, therefore, that the workpieces are fed, one at a time, from the first track 13a through the succeeding tracks to the end track 13e for travel to the feeder track 45 for the demand machines, with the supply of parts to the feeder track 45 beginning in response to a signal that the chute has been emptied to a predetermined low limit. A light R1 connected in parallel with the relay MC indicates a continued supply of current to the circuit 50 and a push button type stop switch 61 is operable to open the circuit at any time further operation of the storage unit 10 is not required.

From the above description it is seen that this invention provides a storage unit 10 which eliminates the necessity for a shutting down of an entire automated line in the event a supply machine is stopped. The number of parts in the storage unit 10 may be anywhere from several hundred to several thousand, depending on the size of the unit which is required. In general, the storage unit 10 is of a size to provide for the temporary storage of a number of parts, the processing of which corresponds to the maximum time required to make tool or other changes on the machine ahead or following the storage unit. Thus, tool changes or other adjustments can be made on any machine at any time without causing any interruption in the production of other machines in the production line.

Individual machines can then be operated at their maximum efficiencies for planned production periods without being limited by what the machine ahead or behind is turning out. For example, one machine with a high output rate could be operated on a one-shift basis, while the machine directly ahead or behind it having a longer machine cycle could be operated on a two-shift basis. Similarly, a certain machine could be operated for portions of one shift while others in the line will run full time. Thus, the operator of the line has considerable flexibility in the use and selection of equipment to obtain the maximum efficiency from the line when storage units 10 are properly assembled in the line.

Although the invention has been described with respect to a preferred embodiment thereof, it is to be understood that it is not to be so limited, since changes can be made therein which are within the scope of the invention as defined by the appended claims.

What is claimed is:

1. A storage unit for workpieces comprising a plurality of side by side storage tracks each of which is formed of a plurality of inclined members arranged in a vertically extending zigzag pattern having an upper inlet end and a lower outlet end, a plurality of endless chain type conveyors arranged in a side by side relation adjacent said tracks and extending vertically for transferring a workpiece from the outlet end of one track to the inlet end of the adjacent track, said conveyors being arranged with said tracks so that a workpiece may be delivered to the inlet end of one of said tracks and moved successively through each of said tracks to the outlet end of the final track, discharge means at the outlet end of each of said tracks operable to discharge workpieces one at a time therefrom onto the conveyor which feeds the next track, and control means for said discharge means located adjacent the inlet end of said next track for actuation by a workpiece therein when said next track is filled with workpieces, said control means rendering said discharge means inoperative in response to actuation of said control means, said control means rendering said discharge means operable in response to a less than filled condition of the track with which it is associated.

2. A storage unit for workpieces comprising a plurality of side by side storage tracks each of which is formed of a plurality of inclined members arranged in a vertically extending zigzag pattern having an upper inlet end and a lower outlet end, a plurality of upright endless chain type conveyors arranged in a side by side relation adjacent said tracks and having workpiece engaging and carrying fingers thereon for transferring a workpiece from the outlet end of one track to the inlet end of the adjacent track, said conveyors being arranged with said tracks so that a workpiece may be delivered to the inlet end of one of said tracks and moved successively through each of said tracks to the outlet end of the final track, discharge means at the outlet end of each of said tracks operable to discharge workpieces one at a time therefrom onto the conveyor which feeds the next track, means responsive to the approach of a finger on said conveyor for the track to a position for receiving a workpiece from said discharge means for operating said discharge means to discharge a workpiece, and control means for said discharge means located adjacent the inlet end of said next track for actuation by a workpiece therein when said next track is filled with workpieces, said control means rendering said discharge means inoperative in response to actuation of said control means, said control means rendering said discharge means operable in response to a less than filled condition of the track with which it is associated.

3. A storage unit for workpieces comprising a plurality of side by side storage tracks each of which is formed of a plurality of inclined members arranged in a vertically extending zig-zag pattern having an upper inlet end and a lower outlet end, a plurality of upright endless chain type conveyors arranged in a side by side relation adjacent said tracks and having workpiece engaging and carrying fingers thereon for transferring a workpiece from the outlet end of one track to the inlet end of the adjacent track, said conveyors being arranged with said tracks so that a workpiece may be delivered to the inlet end of one of said tracks and moved successively through each of said tracks to the outlet end of the final track, discharge means at the outlet end of each of said tracks operable to discharge workpieces one at a time therefrom onto the conveyor which feeds the next track, said discharge means including a cradle member and solenoid means operatively associated with said cradle member for rocking the cradle member for transferring a workpiece from one to the other side thereof, proximity means responsive to the approach of a finger on said conveyor for the track to a position for receiving a workpiece from said discharge means for energizing said solenoid to rock said cradle member, switch means in circuit with said proximity means and located adjacent the inlet end of said next track for actuation by a workpiece therein when said next track is filled with workpieces to an open position preventing energizing of said solenoid whereby to render said discharge means inoperative, said switch being closable in response to a less than filled condition of the track with which it is associated so that said solenoid means is energizable in response to operation of said proximity means.

References Cited in the file of this patent

UNITED STATES PATENTS

| | | |
|---|---|---|
| 392,128 | Meyer | Oct. 30, 1888 |
| 746,247 | Baggaley | Dec. 8, 1903 |
| 1,004,427 | Hillyer | Sept. 26, 1911 |
| 1,004,998 | Crecelius | Oct. 3, 1911 |
| 1,159,728 | Stafford | Nov. 9, 1915 |
| 1,970,574 | Pelosi | Apr. 21, 1934 |
| 2,146,533 | Erickson | Feb. 7, 1939 |
| 2,304,455 | Guerard | Dec. 8, 1942 |
| 2,328,240 | Wiegand | Aug. 31, 1943 |
| 2,430,407 | Nelson | Nov. 4, 1947 |
| 2,470,922 | Dunn | May 24, 1949 |
| 2,726,753 | Bee | Dec. 13, 1955 |
| 2,772,005 | Dubin et al. | Nov. 27, 1956 |
| 2,789,678 | Hickin | Apr. 23, 1957 |